United States Patent
Miryala et al.

(10) Patent No.: US 9,432,872 B2
(45) Date of Patent: Aug. 30, 2016

(54) SYSTEMS AND METHODS FOR DIRECT LINK COMMUNICATION WITH MULTI-CHANNEL CONCURRENCY

(71) Applicant: QUALCOMM INCORPORATED, San Diego, CA (US)

(72) Inventors: Sriman Miryala, Hyderabad (IN); Pradeep Kumar Yenganti, Sunnyvale, CA (US); Ashwani Kumar Dwivedi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 263 days.

(21) Appl. No.: 14/086,213

(22) Filed: Nov. 21, 2013

(65) Prior Publication Data
US 2015/0139203 A1   May 21, 2015

(51) Int. Cl.
| | |
|---|---|
| H04L 29/06 | (2006.01) |
| H04W 28/02 | (2009.01) |
| H04W 8/00 | (2009.01) |
| H04W 72/12 | (2009.01) |
| H04W 88/06 | (2009.01) |
| H04L 12/403 | (2006.01) |
| H04L 12/701 | (2013.01) |
| H04W 76/02 | (2009.01) |
| H04W 72/04 | (2009.01) |

(52) U.S. Cl.
CPC ......... *H04W 28/0263* (2013.01); *H04W 8/005* (2013.01); *H04W 28/02* (2013.01); *H04W 72/1278* (2013.01); *H04L 12/403* (2013.01); *H04L 29/06027* (2013.01); *H04L 45/00* (2013.01); *H04W 72/0453* (2013.01); *H04W 76/023* (2013.01); *H04W 88/06* (2013.01)

(58) Field of Classification Search
CPC .. H04W 8/005; H04W 88/06; H04L 12/403; H04L 29/06027; H04L 45/00
See application file for complete search history.

(56) References Cited

U.S. PATENT DOCUMENTS

| | | | |
|---|---|---|---|
| 7,251,235 B2 | 7/2007 | Wentink | |
| 8,259,632 B2 | 9/2012 | Seok et al. | |
| 8,279,757 B2 | 10/2012 | Seok | |
| 8,326,372 B2 | 12/2012 | Raissinia | |
| 2004/0019725 A1* | 1/2004 | Ellerbrock et al. | 710/305 |
| 2012/0120892 A1 | 5/2012 | Freda et al. | |
| 2013/0301496 A1* | 11/2013 | Nagaraj et al. | 370/311 |
| 2014/0254422 A1* | 9/2014 | Mehta | 370/254 |

* cited by examiner

*Primary Examiner* — Raj Jain
(74) *Attorney, Agent, or Firm* — Paradice and Li LLP

(57) ABSTRACT

Systems and methods are provided for allowing a multi-channel concurrent device to communicate timing information to a direct link peer, so that subsequent delivery of buffered traffic by the peer may be coordinated to minimize interference with operation of the device in another network context.

19 Claims, 5 Drawing Sheets

SYSTEMS AND METHODS FOR DIRECT LINK COMMUNICATION WITH MULTI-CHANNEL CONCURRENCY

FIELD OF THE PRESENT DISCLOSURE

The present disclosure generally relates to wireless communications and more particularly relates to systems and methods for performing direct communication between a multi-concurrent wireless communications device and a peer.

BACKGROUND

Due to the wide availability, popularity and convenience of wireless local area network (WLAN) communications, such as those conforming to Institute for Electrical and Electronic Engineers (IEEE) 802.11 protocols, it may be desirable for one device to participate in multiple network contexts. Examples of conventional network roles include a station (STA) and an access point (AP) in an infrastructure network or a peer to peer (P2P) client and a P2P group owner (GO) in a WiFi Direct™ network. As such, a single device may participate in multiple networks, acting in an appropriate role for each network context. Such devices, known as concurrent devices, may satisfy the separate roles by spending sufficient time operating in each context to maintain the respective communication links. Often, coordination of the time spent in each network context involves participating in each network at designated times in order to send or receive scheduled network communications, such as a beacon that is sent at specified intervals and used to coordinate and synchronize devices participating in that network. For example, a multi-channel concurrent device may operate as a STA in a first network on one wireless channel and an AP in a second network on another wireless channel. As a practical matter, each network may operate on a separate wireless channel so that a minimum level of participation involves the device switching channels at intervals in order to receive the beacon being sent on the first network and to broadcast the beacon for the second network.

Further, depending upon desired performance characteristics and available resources, WLAN devices may form a variety of different links. One such link is typified by the formation of a basic service set (BSS) in which devices acting as STAs may associate with an AP, such that communications to and from the STAs are routed through the AP. However, it may be desirable for two STAs to form a direct link with each other, avoiding the AP. For example, Tunneled Direct Link Setup (TDLS) is a protocol that allows two STAs to establish a direct link with each other. Under this protocol, frames may be passed directly between the participating STAs once initial negotiations to establish capabilities and set parameters are conducted though the AP.

Although notable benefits are associated with the use of a direct link, conventional TDLS power management techniques may interfere with concurrent operation in another network context. In an exemplary usage scenario, data for a first STA having a TDLS link with a second STA may be buffered at the second STA when the first STA is unavailable on the direct link, such as when the first STA is in power save mode or performing a role in different network context on another channel. The second STA may communicate the existence of the buffered data through use of a peer traffic indication (PTI) frame that is relayed through the AP. Upon receipt of the PTI frame, the first STA sends a peer traffic response (PTR) trigger frame directly to the second STA. This establishes an interval during which the second STA delivers all the data that has been buffered for the first STA. This interval may exist for the amount of time required to successfully transmit the buffered data, as the second STA will continue to send buffered data until all has been delivered.

However, if the first STA is a multi-channel concurrent device as discussed above, it may periodically operate on other wireless channels, such as to perform the minimum obligations in each network context in order to maintain the links. Accordingly, the multi-channel concurrent device may operate for a limited period of time on one channel before being scheduled to switch to another channel associated with a separate network context in order to satisfy its role in that context. If the amount of data buffered at the second STA is too large, the time required to deliver all the data may exceed the amount of time allotted to the first STA for operating on the direct link channel in the current period. As a result, the first STA must either switch channels and miss receiving the buffered data that remains or disrupt operation in the other network context by not participating as scheduled.

Accordingly, the techniques of this disclosure provide systems and methods for allowing a multi-channel concurrent wireless communications device to communicate timing information regarding scheduled availability on the direct link channel to a peer. In turn, the peer may then coordinate delivery of the buffered traffic based, at least in part, on the timing information to reduce interference with operation of the device in another network context.

SUMMARY

This disclosure includes methods to perform direct wireless communication between a multi-concurrent wireless communications device and a peer, including communicably coupling the wireless communications device to the peer on a first wireless channel in a first network context, buffering data for the wireless communications device at the peer, relaying an indication from the peer to the wireless communications device through an access point that buffered data is present, communicating timing information from the wireless communications device to the peer regarding a scheduled switch of the wireless communications device to a second wireless channel, transmitting a signal from the wireless communications device to the peer to trigger delivery of the buffered data and receiving buffered data from the peer with the wireless communications device for a delivery period corresponding to the timing information.

In one aspect, the wireless communications device may receive a current frame of buffered data having an end of service period indication when the peer has determined that insufficient time remains in the delivery period to transfer a subsequent frame of buffered data. Further, the wireless communications device may buffered data remaining at the peer after transmission of the current frame during a subsequent delivery period.

In another aspect, the wireless communications device may operate on the second wireless channel in a second network context after the delivery period. As desired, data may be buffered at the peer while the wireless communications device is on the second wireless channel.

In yet another aspect, the timing information may be based, at least in part, on scheduled participation of the wireless communications device in the second network context. As desired, the timing information may be a duration determined with regard to a target beacon transmission time associated with the second network context.

Further, the timing information may be incorporated into the signal transmitted to the peer to trigger delivery of the buffered data.

In one embodiment, the direct link may conform to a tunneled direct link setup (TDLS) protocol. Further, the timing information may be incorporated into a peer traffic response (PTR) frame.

This disclosure also includes a multi-concurrent wireless communications device that may be configured to perform direct wireless communication with a peer on a first wireless channel in a first network context. The wireless communications device may include a concurrency controller to determine timing information based, at least in part, on a scheduled switch of the wireless communications device to a second wireless channel and a transceiver to communicably couple the wireless communications device to the peer, wherein the transceiver may communicate the timing information to the peer and may transmit a signal to trigger delivery of buffered data from the peer after receiving indication that buffered data is available.

In one aspect, the wireless communications device may participate in a second network context by operating the transceiver on the second wireless channel. Further, the timing information may be based, at least in part, on scheduled participation of the wireless communications device in the second network context. Still further, the timing information may be a duration determined with regard to a target beacon transmission time associated with the second network context.

In another aspect, the transceiver may incorporate the timing information into the signal transmitted to the peer to trigger delivery of the buffered data.

In one embodiment, the direct link may conform to a tunneled direct link setup (TDLS) protocol.

This disclosure also includes a peer to perform direct wireless communication with a multi-concurrent wireless communications device on a first wireless channel in a first network context. The peer may include a memory to buffer data for the wireless communications device when the wireless communications device is unavailable, a transceiver to communicably couple the peer to the wireless communications device, wherein the transceiver may relay an indication of the availability of buffered data for the wireless communications device through an access point, and a buffer controller to coordinate transmission of the buffered data during a delivery period based, at least in part, on timing information received from the wireless communications device in response to the indication of buffered data availability.

In one aspect, the buffer controller may determine whether sufficient time remains in the delivery period to transfer a subsequent frame of buffered data before the transceiver sends a current frame of buffered data and the transceiver may send the current frame with an end of service period indication when insufficient time remains. Further, the transceiver may send buffered data remaining after transmission of the current frame with an end of service period indication during a subsequent delivery period.

In one embodiment, the direct link may conform to a tunneled direct link setup (TDLS) protocol.

BRIEF DESCRIPTION OF THE DRAWINGS

Further features and advantages will become apparent from the following and more particular description of the preferred embodiments of the disclosure, as illustrated in the accompanying drawings, and in which like referenced characters generally refer to the same parts or elements throughout the views, and in which.

DETAILED DESCRIPTION

Figure 1:
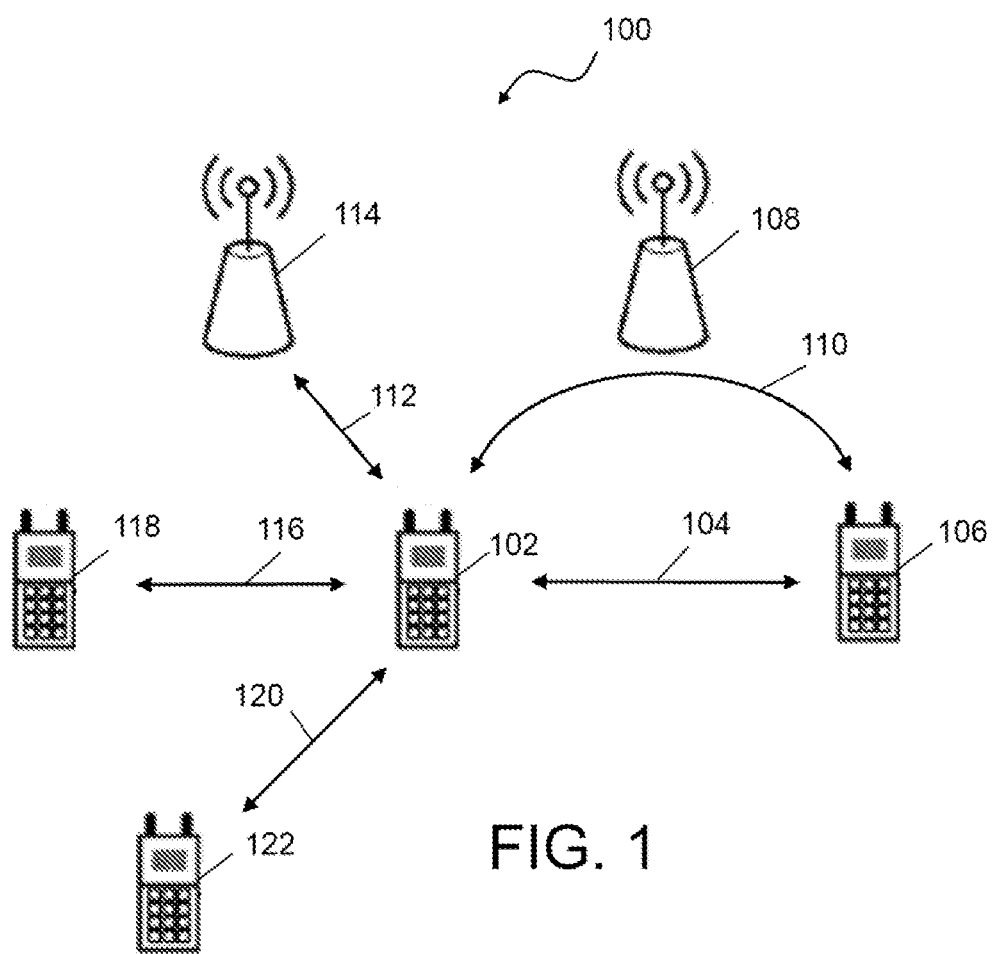
FIG. 1 schematically depicts a wireless environment including communication in multiple network contexts, according to one embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing." "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Embodiments are described herein with regard to a wireless communications device, which may include any suitable type of user equipment, such as a system, subscriber unit, subscriber station, mobile station, mobile wireless terminal, mobile device, node, device, remote station, remote terminal, terminal, wireless communication device, wireless communication apparatus, user agent, or other client devices. Further examples of a wireless communications device include mobile devices such as a cellular telephone, cordless telephone, Session Initiation Protocol (SIP) phone, smart phone, wireless local loop (WLL) station, personal digital assistant (PDA), laptop, handheld communication device, handheld computing device, satellite radio, wireless modem card and/or another processing device for communicating over a wireless system. Moreover, embodiments may also be described herein with regard to an access point (AP). An AP may be utilized for communicating with one or more wireless nodes and may be termed also be called and exhibit functionality associated with a base station, node, Node B, evolved NodeB (eNB) or other suitable network entity. An AP communicates over the air-interface with wireless terminals. The communication may take place through one or more sectors. The AP may act as a router between the wireless terminal and the rest of the access network, which may include an Internet Protocol (IP) network, by converting received air-interface frames to IP packets. The AP may also coordinate management of attributes for the air interface, and may also be the gateway between a wired network and the wireless network.

Unless defined otherwise, all technical and scientific terms used herein have the same meaning as commonly understood by one having ordinary skill in the art to which the disclosure pertains.

Finally, as used in this specification and the appended claims, the singular forms "a," "an" and "the" include plural referents unless the content clearly dictates otherwise.

The following discussion is in the context of embodiments in which a multi-channel wireless communications device operates on different channels in order to participate in multiple network contexts. FIG. 1 depicts an exemplary communication system 100, featuring a multi-concurrent wireless communications device 102 configured to operate in multiple network contexts. In this embodiment, wireless communications device 102 may establish direct link 104, such as a connection conforming to TDLS protocols, with a first peer device 106 that is associated with the basic service set (BSS) managed by AP 108. Following conventional practice, wireless communications device 102 and peer device 106 may route initial setup and configuration frames through AP as indicated by exchange 110. Subsequent communications may occur over direct link 104 between wireless communications device 102 and peer 106 without involvement of AP 108. As will be appreciated, this allows wireless communications device 102 and peer 106 to select a desired communication protocol supported by the devices without being limited by the capabilities of AP 108. Further, direct link 104 may also represent a more efficient use of communication resources since the exchange of frames between the participating devices does not require intermediate reception and retransmission by AP 108. Direct link 104 may be established on the same wireless channel as used by AP 108, a "base" channel, or a switch to another wireless channel, an "off" channel, may be negotiated by the devices following initial operation on the base channel as desired. As used herein, the term "peer" is intended only to refer to another node with which communications may be exchanged using the direct link and does not imply any equivalence, technologically or otherwise, other than the ability to employ the wireless protocol associated with the direct link, such as a TDLS protocol.

As noted above, a multi-concurrent wireless communications device may operate in one or more additional network contexts using a time multiplexing strategy. For example, wireless communications device 102 may switch to a channel other than the base channel in order to participate in an additional network, to exchange information and/or perform any obligations associated with maintaining the additional link. In the embodiment shown in FIG. 1, wireless communications device 102 may switch to a separate wireless channel to utilize link 112 with AP 114, thereby participating in the BSS managed by AP 114. Alternatively, or in addition, wireless communications device 102 may form an ad hoc or peer to peer communications link 116 with a second peer 118, such as by using a WiFi Direct™ P2P protocol or other suitable technique. Also alternatively or in addition, wireless communications device 102 may be configured to function as an AP to manage its own BSS, such as in the role of a software-enabled AP (softAP) and form link 120 with STA 122. These examples are intended to be representative only as wireless communications device 102 may form or participate in any suitable network context on one or more additional wireless channels.

Accordingly, wireless communications device 102 may switch from the base wireless channel associated with AP 108 to another wireless channel to participate in another network context. Some network context events may be periodic, such that wireless communications device 102 may switch to the additional channel at designated times to fulfill the corresponding network obligations, such as receiving or transmitting beacons. Periods of time may also be allocated for operation in each network context to maintain a desired level of performance. By employing the techniques of this disclosure, wireless communications device 102 may communicate timing information regarding scheduled participation on other wireless channels to peer 106. In turn, peer 106 may coordinate subsequent transmissions to wireless communications device 102 based, at least in part, on the timing information.

Figure 2:
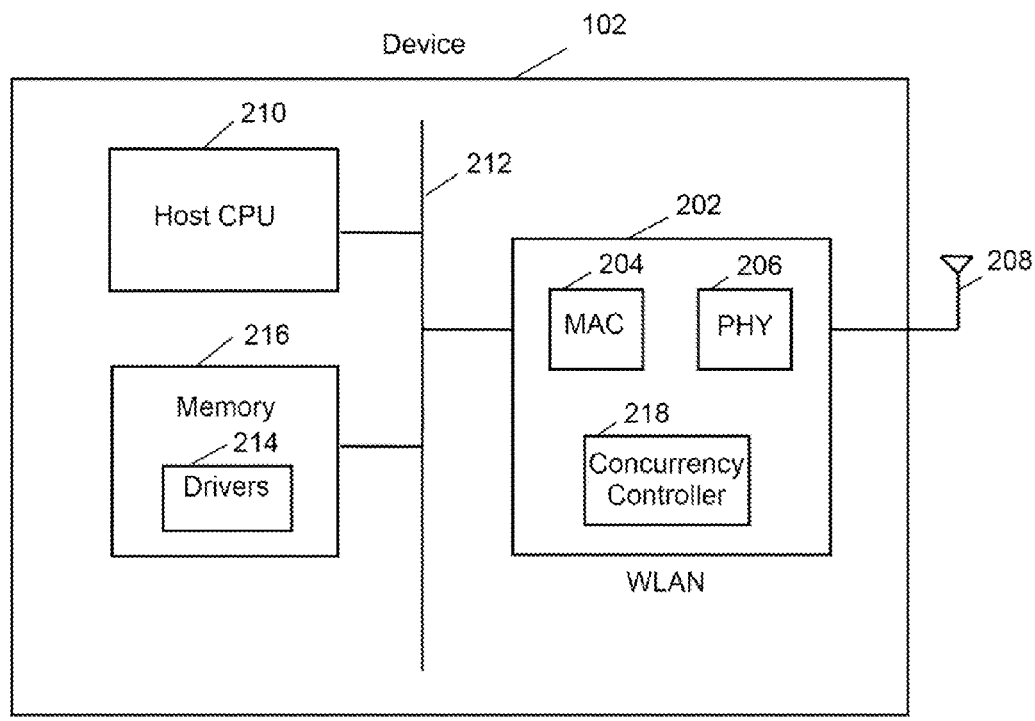
FIG. 2 schematically depicts functional blocks of a multi-concurrent wireless communications device, according to one embodiment.

Additional details regarding one embodiment of wireless communications device 102 are depicted as high level schematic blocks in FIG. 2. As shown, wireless communications device 102 may employ an architecture in which the lower levels of the WLAN protocol stack are implemented through firmware and/or hardware in WLAN module 202. WLAN module 202 may therefore include media access controller (MAC) 204 that performs functions related to the handling and processing of frames of data including verification, acknowledgment, routing, formatting and the like. Incoming and outgoing frames are exchanged between MAC 204 and physical layer (PHY) 206, which may include the functions of modulating the frames according to the relevant 802.11 protocol as well as providing the analog processing and RF conversion necessary to provide transmission and reception of wireless signals through antenna 208. While only one antenna 208 is shown for illustration purposes, wireless communications device 102 may include multiple antennas for use in, e.g., transmitting (and/or receiving) multiple outputs (and inputs).

Wireless communications device 102 may also include host CPU 210 configured to perform the various computations and operations involved with the functioning of wireless communications device 102. Host CPU 210 is coupled to WLAN module 202 through bus 212, which may be implemented as a peripheral component interconnect express (PCIe) bus, a universal serial bus (USB), a universal asynchronous receiver/transmitter (UART) serial bus, a suitable advanced microcontroller bus architecture (AMBA) interface, a serial digital input output (SDIO) bus, or other equivalent interface. Upper layers of the protocol stacks of the WLAN system may be implemented in software as Drivers 214 stored in memory 216 that may be accessed by host CPU 210 over bus 212.

In one aspect, wireless communications device 102 may include concurrency controller 106 that may be implemented in WLAN module 202 as shown, such as at the MAC 204 layer. In other embodiments, it may be desirable to implement concurrency controller 106 as processor-readable instructions stored in memory 216 that may be executed by host CPU 210. Further, concurrency controller 218 may be implemented using firmware, software, hardware, or any suitable combination as desired. According to the techniques of this disclosure, concurrency controller 218 may maintain a schedule of periods of operation on the base channel and on the one or more alternate wireless channels corresponding to the participation of wireless communications device 102 in each network context. In one aspect, the operation schedule may include periodically reoccurring events in the other network contexts, such as target beacon transmit times (TBTTs). As will be described in detail below, concurrency controller 218 may communicate timing information regarding the operation schedule to first peer 106 to facilitate coordination of communication over direct link 104.

Figure 3:
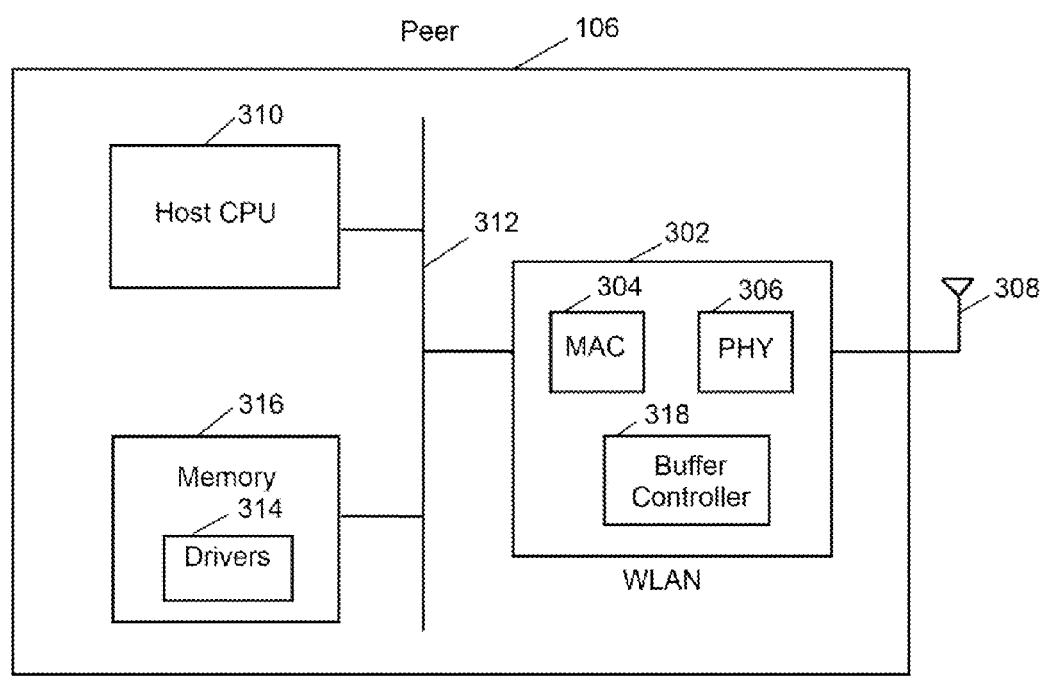
FIG. 3 schematically depicts functional blocks of a peer that may coordinate with a multi-concurrent wireless communications device, according to one embodiment.

In another aspect, one embodiment of peer 106 is depicted in FIG. 3, showing principle functional blocks in a high level schematic diagram. Generally, peer 106 may also employ a similar architecture in which WLAN module 302 includes MAC 304 and PHY 306 coupled to antenna 308. Similar to wireless communications device 102, while only one antenna 308 is shown for illustration purposes, peer 106 may include multiple antennas for use in, e.g., receiving multiple inputs. Likewise, peer 106 may include host CPU 310 configured to perform the various computations and operations involved with the functioning of peer 106. Accordingly, host CPU 310 may be coupled to WLAN module 302 through bus 312, as described similarly for wireless communications device 102. Upper layers of the protocol stacks of the WLAN system may be implemented in software as Drivers 314 stored in memory 316 that may be accessed by host CPU 310 over bus 312. Peer 106 may also buffer information for transmission to wireless communications device 102 in memory 316 during periods when wireless communications device 102 is unavailable, such as when wireless communications device 102 is operating on an alternate wireless channel in another network context. In other embodiments, other architectures may be employed such that data is buffered locally in WLAN module 302 or at any other suitable location.

Pursuant to the techniques of this disclosure, peer 106 may include buffer controller 318 to receive the timing information received from wireless communications device 102 and to coordinate subsequent delivery of information over direct link 104. Notably, buffer controller 318 may limit transmission of buffered data to wireless communications device 102 to a delivery period based, at least in part, on the timing information. As desired, buffer controller 318 may be implemented in WLAN module 302 as shown, such as at the MAC 304 layer or as processor-readable instructions stored in memory 316 that may be executed by host CPU 310. Further, buffer controller 318 may be implemented using firmware, software, hardware, or any suitable combination as desired.

Figure 4:
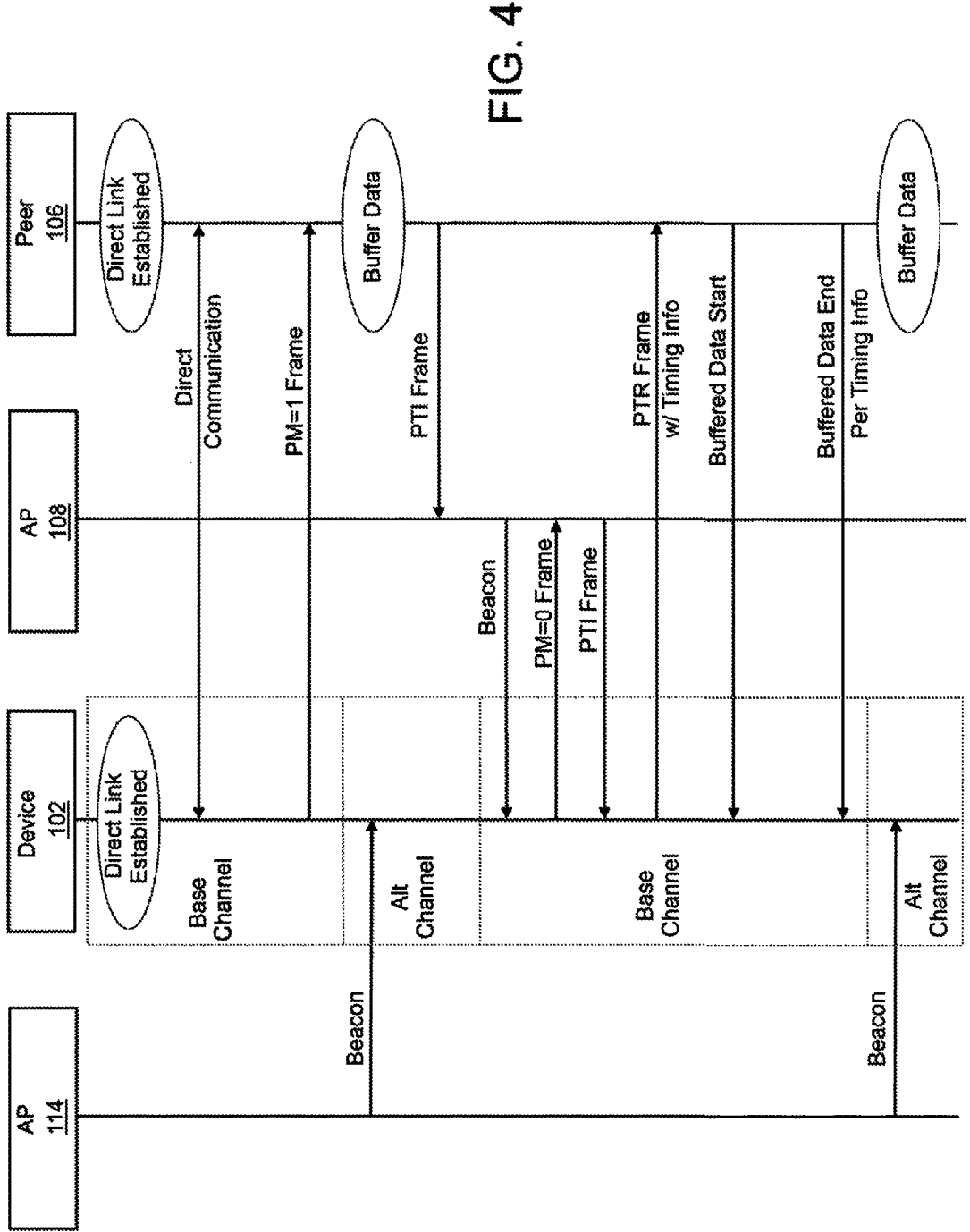
FIG. 4 depicts a sequence diagram of operation of a multi-concurrent wireless communications device in multiple network contexts, according to one embodiment.

To help illustrate use of the timing information transmitted by wireless communications device 102 to peer 106 to coordinate subsequent delivery of buffered data, FIG. 4 depicts a sequence diagram in the context of communication system 100. Wireless communications device 102 and peer 106 may negotiate the establishment of direct link 104 though AP 108 using conventional techniques, which are not shown for clarity. Upon formation of direct link 104, wireless communications device 102 and 106 may exchange information while wireless communications device 102 is operating on the base channel. Prior to switching to the alternate channel, wireless communications device 102 may signal unavailability on the base channel to peer 106, such as by setting the power management bit in the frame control field of a transmitted frame. Wireless communications device 102 may then participate in another network context, such as by receiving a beacon and/or exchanging information with AP 114 as shown. In other implementations, wireless communications device 102 may participate in additional or alternative network contexts, such as by communicating with second peer 118 or STA 122 as described above, or by performing any other suitable network role.

While wireless communications device 102 is operating on an alternate channel, peer 106 may buffer data intended for wireless communications device 102 rather than transmitting it.

To signal the availability of buffered data, peer 106 sends a PTI frame to AP 108, to be relayed to wireless communications device 102. AP 108 may indicate the pending PTI frame using an appropriate traffic indication message (TIM) in the next beacon. Correspondingly, wireless communications device 102 may return to the base channel and receive the beacon from AP 108. Wireless communications device 102 may trigger the delivery of the PTI frame from AP 108 by sending a frame with the power management bit unset, by sending a PS-Poll frame or in any other suitable manner. AP 108 then delivers the PTI frame to wireless communications device 102, thereby informing wireless communications device 102 that peer 106 has buffered data pending transmission.

Wireless communications device 102, such as through concurrency controller 218, may determine a scheduled return of operation to the alternate channel. In one aspect, this may be based, at least in part, on a scheduled network obligation, such as receiving a beacon sent by AP 114 according to the TBTT. Other network obligations may depend on the role being performed by wireless communications device 102 in the other network context and may include transmitting a beacon or otherwise participating in a scheduled network event. Further, periods of participation in other network contexts may be scheduled in order to obtain a desired level of performance. Accordingly, wireless communications device 102 may communicate timing information indicating when return to the alternate channel is scheduled. In one embodiment, wireless communications device 102 may transmit the timing information in the PTR frame used to initiate delivery of the buffered data from peer 106 as shown. Alternatively, the timing information may be conveyed to peer 106 in any suitable manner, such as through a different frame, and may be transmitted directly to peer 106 or may be relayed through AP 108 as desired.

Peer 106 may then coordinate delivery of the buffered data using the received timing information to establish a delivery period corresponding to the time wireless communications device 102 may remain on the base channel. For example, peer 106 may start delivery of the buffered data after receiving the PTR frame. Prior to transmission of each frame of buffered data, buffer controller 318 may determine whether sufficient time remains in the delivery period. If all of the data buffered at peer 106 may be delivered within the delivery period, standard protocols may be followed. However, when buffer controller 318 determines insufficient time remains to transmit a subsequent frame, peer 106 may end delivery of the buffered data as shown and transmit the current frame with an end of service period (EOSP) indication. Thus, upon receipt of a buffered data frame with an EOSP indication, wireless communications device 102 may safely switch to the alternate channel to perform the obligation in the other network context. In one embodiment, the EOSP may be indicated by unsetting the More Data bit in the frame control segment of the header of the current frame.

Buffer controller 318 may determine whether the time remaining in the delivery period is sufficient using any desired criteria, including transmission rate, size of the frames, recent wireless environment conditions, performance statistics and the like. Any undelivered buffered data may be reserved for transmission during a subsequent delivery period that may be established in a similar manner after wireless communications device 102 completes operation on the alternate channel and returns to the base channel. For example, peer 106 may use a PTI frame relayed through AP 108 to indicate the existence of such data as described above. Further, as shown, peer 106 returns to buffering data for wireless communications device 102 such that new data may be added to the queue.

As will be appreciated, the techniques of this disclosure represent an improvement over conventional direct link protocols. Standard protocols dictate that peer 106 deliver all of the data that had been buffered once wireless communications device 102 responds to the PTI frame. Depending on the amount of buffered data, as well as network conditions and transfer rate, delivery of all the buffered data may require more time than is available before wireless communications device 102 is scheduled to return to the alternate channel. Without the coordination afforded by the timing information, peer 106 simply continues to deliver the buffered data, which results in wireless communications device 102 either switching to the alternate channel as scheduled and missing delivery of a portion of the data or remaining on the base channel and not participating in the other network context as scheduled.

Transmission of the timing information regarding a scheduled channel switch for wireless communications device 102 may be accomplished in any suitable manner, as noted above. In one embodiment, the PTR frame may be used to convey the information. For example, the format of the PTR frame may be expanded to include a channel switch information element (CSIE) having a duration field to allow wireless communications device 102 to specify a duration that buffer controller 318 may use to establish the delivery period. For example, the duration may correspond to the period of time before a switch to the alternate channel is scheduled as described. Capabilities with regard to delivery and use of the timing information according to this disclosure may be advertised during establishment of direct link 104 in any suitable manner. Alternatively, direct link peer 106 may be configured to infer the existence of such capabilities when receiving a PTR frame from wireless communications device 102 having a CSIE with a duration specified.

Figure 5:
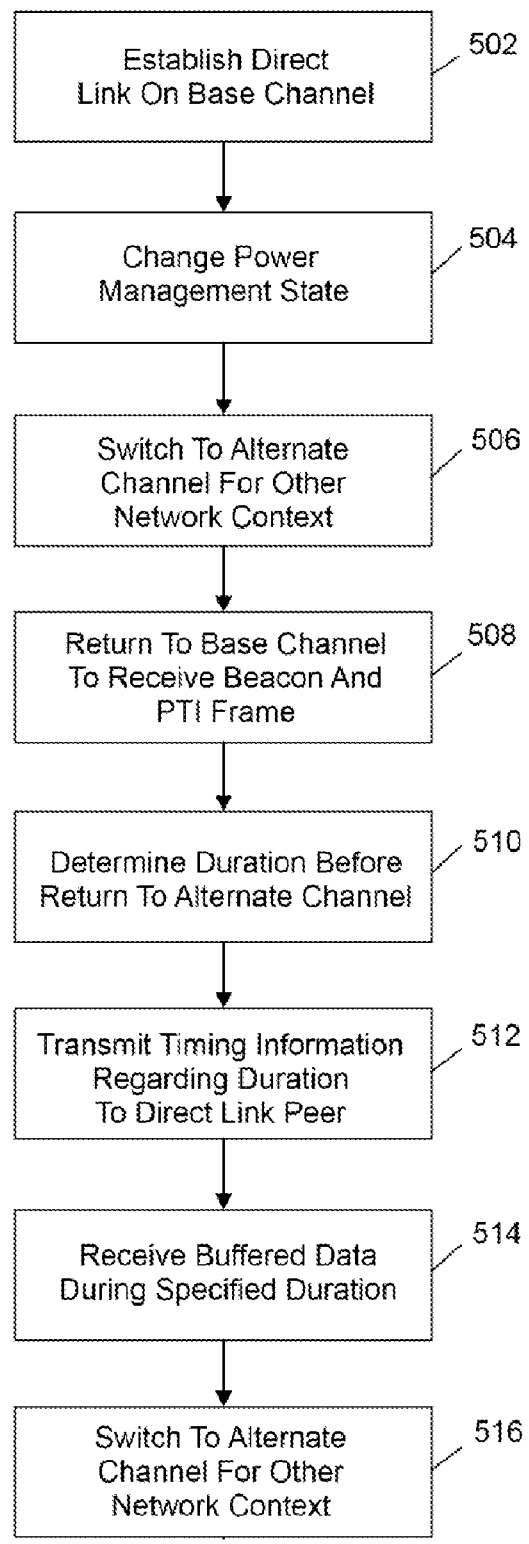
FIG. 5 is a flowchart showing an exemplary routine for coordinating operation of a multi-concurrent wireless communications device with a peer, according to one embodiment.

An example of the coordination between wireless communications device 102 and peer 106 is depicted in reference to the flowchart of FIG. 5. As shown, the routine may begin at 502 with wireless communications device 102 and peer 106 establishing a direct link on a base channel, for example through TDLS protocols. In 504, wireless communications device 102 may signal a change in power management state to peer 106 and then switch to an alternate channel to perform a role in another network context as indicated by 506. After participating in the other network context, such as by fulfilling network obligations to maintain the link, wireless communications device 102 may return to the base channel to receive a beacon sent by AP 108, and after a suitable trigger, a PTI frame from peer 106 that is relayed by AP 108 in 508. Next, concurrency controller 218 may determine the amount of time until participation in another network context is scheduled in 510. Timing information regarding the duration may be communicated to peer 106 as indicated by 512. As desired, the timing information may be transmitted in the PTR frame used to trigger delivery of the buffered data. Wireless communications device 102 may then receive buffered data during the delivery period in 514 before switching to the alternate channel for another instance of participation in the other network context in 516.

Figure 6:
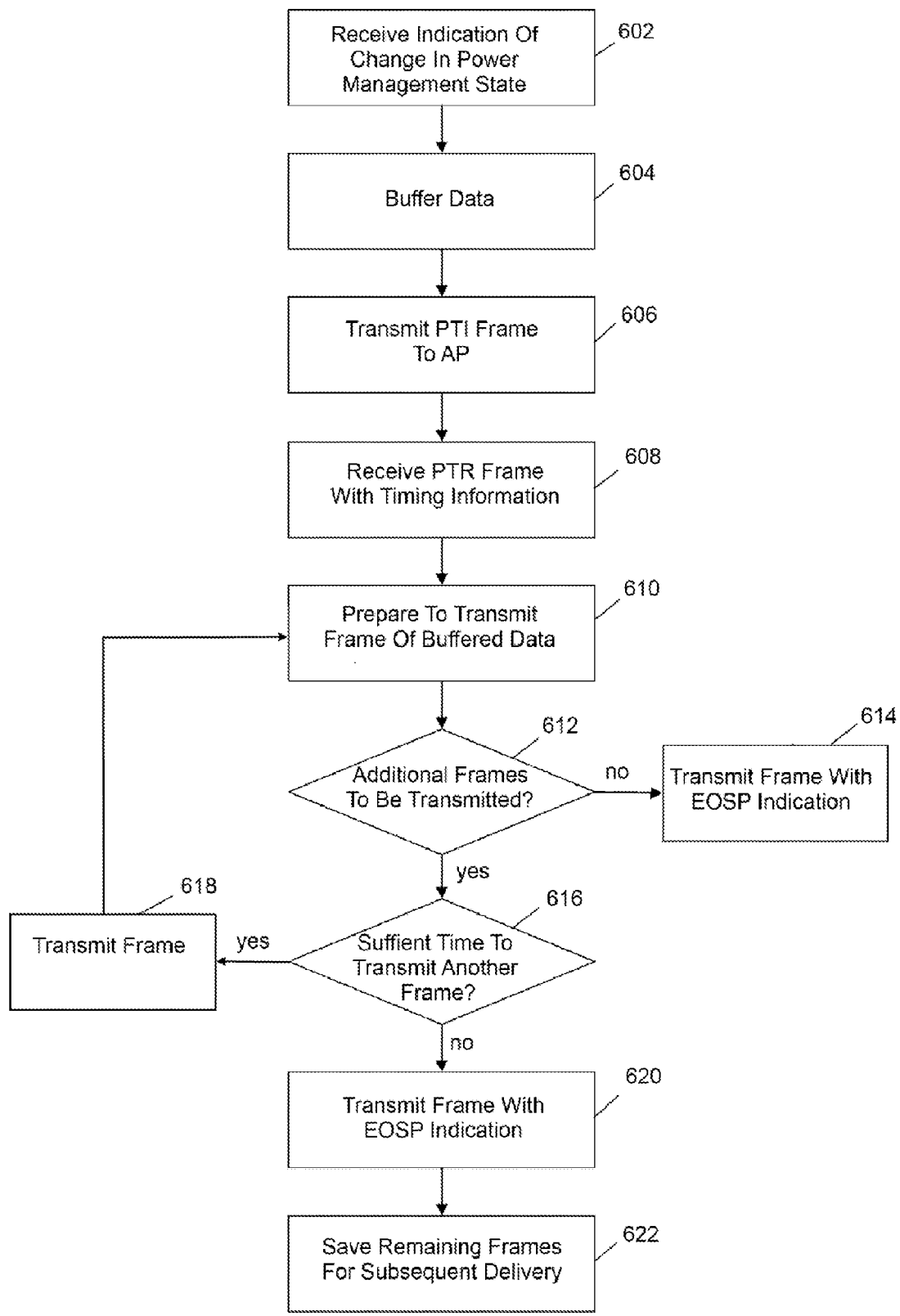
FIG. 6 is a flowchart showing an exemplary routine for coordinating operation of a peer with a multi-concurrent wireless communications device, according to one embodiment.

Another example of the techniques of this disclosure from the perspective of peer 106 is depicted in reference to the flowchart of FIG. 6. As shown, the routine may begin at 602 with peer 106 receiving an indication of change in power management state for wireless communications device 102 associated with the impending channel switch. Accordingly, in 604 peer 106 may buffer data for wireless communications device 102 rather than transmitting it. To signal the existence of the buffered data, peer 106 transmits a PTI frame to AP 108 for subsequent delivery to wireless communications device 102 in 606. After wireless communications device 102 returns to the base channel and receives the PTI frame, it may trigger delivery of the buffered data by sending a PTR frame. Peer 106 receives the PTR frame, which may include timing information regarding a scheduled channel switch away from the base channel from wireless communications device 102 in 608. Peer 106 then coordinates delivery of the buffered data during the delivery period specified by wireless communications device 102, which corresponds to scheduled operation on the base channel. As indicated by 610, peer 106 first prepares to transmit the current frame from the head of the buffered data queue. If no additional frames are buffered as determined in 612, the routine proceeds to 614 and peer 106 transmits the current frame with an EOSP indication to signal all the buffered data has been delivered. Alternatively, if additional frames are buffered, the routine instead flows to 616 and buffer controller 318 determines whether sufficient time remains to transmit another frame. If so, the current frame is transmitted in 618 and the routine returns to 610. Otherwise, the current frame is transmitted with an EOSP indication in 620. Any remaining frames are then stored for delivery during a subsequent period when wireless communications device 102 is operating on the base channel as indicated by 622.

Described herein are certain exemplary embodiments. However, one skilled in the art that pertains to the present embodiments will understand that the principles of this disclosure can be extended easily with appropriate modifications to other applications.

What is claimed is:

1. A method for performing direct wireless communication between a multi-concurrent wireless communications device and a peer, comprising:
    communicably coupling the wireless communications device to the peer on a first wireless channel in a first network context;
    buffering data for the wireless communications device at the peer;
    relaying an indication from the peer to the wireless communications device through an access point that buffered data is present;
    communicating timing information from the wireless communications device to the peer regarding a scheduled switch of the wireless communications device to a second wireless channel;
    transmitting a signal from the wireless communications device to the peer to trigger delivery of the buffered data; and
    receiving buffered data from the peer with the wireless communications device for a delivery period corresponding to the timing information.

2. The method of claim 1, further comprising receiving a current frame of buffered data with the wireless communications device when the peer has determined that insufficient time remains in the delivery period to transfer a subsequent frame of buffered data, wherein the current frame has an end of service period indication.

3. The method of claim 2, further comprising receiving buffered data remaining at the peer after transmission of the current frame with the wireless communications device during a subsequent delivery period.

4. The method of claim 1, further comprising operating the wireless communications device on the second wireless channel in a second network context after the delivery period.

5. The method of claim 1, wherein the timing information is based, at least in part, on scheduled participation of the wireless communications device in the second network context.

6. The method of claim 5, wherein the timing information comprises a duration determined with regard to a target beacon transmission time associated with the second network context.

7. The method of claim 1, wherein the timing information is incorporated into the signal transmitted to the peer to trigger delivery of the buffered data.

8. The method of claim 1, wherein the direct link conforms to a tunneled direct link setup (TDLS) protocol.

9. The method of claim 8, wherein the timing information is incorporated into a peer traffic response (PTR) frame.

10. A multi-concurrent wireless communications device to perform direct wireless communication with a peer on a first wireless channel in a first network context, comprising:
a concurrency controller to determine timing information based, at least in part, on a scheduled switch of the wireless communications device to a second wireless channel; and
a transceiver for communicably coupling the wireless communications device to the peer, wherein the transceiver to communicate the timing information to the peer and to transmit a signal to trigger delivery of buffered data from the peer after receiving indication relayed by an access point that buffered data is available at the peer.

11. The wireless communications device of claim 10, wherein the wireless communications device to participate in a second network context by operating the transceiver on the second wireless channel.

12. The wireless communications device of claim 11, wherein the timing information is based, at least in part, on scheduled participation of the wireless communications device in the second network context.

13. The wireless communications device of claim 12, wherein the timing information comprises a duration determined with regard to a target beacon transmission time associated with the second network context.

14. The wireless communications device of claim 10, wherein the transceiver to incorporate the timing information into the signal transmitted to the peer to trigger delivery of the buffered data.

15. The wireless communications device of claim 10, wherein the direct link conforms to a tunneled direct link setup (TDLS) protocol.

16. A peer to perform direct wireless communication with a multi-concurrent wireless communications device to on a first wireless channel in a first network context, comprising:
a memory for buffering data for the wireless communications device when the wireless communications device is unavailable;
a transceiver for communicably coupling the peer to the wireless communications device, wherein the transceiver to relay an indication of the availability of buffered data for the wireless communications device through an access point; and
a buffer controller to coordinate transmission of the buffered data during a delivery period based, at least in part, on timing information received from the wireless communications device in response to the indication of buffered data availability.

17. The peer of claim 16, wherein the buffer controller further to determine whether sufficient time remains in the delivery period to transfer a subsequent frame of buffered data before the transceiver sends a current frame of buffered data and wherein the transceiver to send the current frame with an end of service period indication when insufficient time remains.

18. The peer of claim 17, wherein the transceiver further to send buffered data remaining after transmission of the current frame with an end of service period indication during a subsequent delivery period.

19. The peer of claim 16, wherein the direct link conforms to a tunneled direct link setup (TDLS) protocol.

* * * * *